United States Patent Office 2,817,651
Patented Dec. 24, 1957

2,817,651

SOLUBLE COPOLYMERS

Earl C. Chapin, Springfield, and Richard F. Smith, Ludlow, Mass., assignors to Monsanto Chemical Company, St. Louis, Mo., a corporation of Delaware No Drawing. Application January 17, 1955, Serial No. 482,386

10 Claims. (Cl. 260—86.1)

This invention relates to copolymers of unsaturated alcohols with acrylic esters. More particularly the invention relates to a process for preparing such copolymers in organic solvent soluble form.

Copolymers prepared from unsaturated alcohols such as allyl alcohol and acrylic esters such as ethyl acrylate by conventional processes of heating mixtures of the monomers with oxygen or peroxide catalysts at temperatures up to 100° C., have a relatively high molecular weight and are difficultly soluble in organic solvents due to extensive crosslinking during the copolymerization reaction.

One object of this invention is to provide soluble copolymers of unsaturated alcohols and acrylic esters.

A further object is to provide a process for copolymerizing unsaturated alcohols with acrylic esters to provide copolymers of low molecular weight and good solubility in organic solvents.

Another object of this invention is to provide a process for copolymerizing unsaturated alcohols with acrylic esters which minimizes crosslinking during the polymerization reaction.

These and other objects are attained by copolymerizing unsaturated alcohols with acrylic esters at temperatures of 150–250° C. under autogenous pressure.

In the following illustrative examples, parts are by weight.

*Example I*

Mix together 35 parts of ethyl acrylate, 15 parts of allyl alcohol and 0.2 part of di-tertiarybutyl peroxide. Heat the mixture in a closed reaction vessel in the substantial absence of oxygen at 150° C. for 1 hour. The product is a viscous syrup comprising a solution of the copolymer in unreacted monomer. Remove the monomer by vacuum distillation at 110° C. to obtain a clear colorless soft solid soluble in butanol, methanol, acetone, dimethyl formamide, xylene-butanol mixtures and hot xylene. The copolymer contains about 4.4% hydroxyl groups by weight.

Prepare a series of copolymers under conditions substantially as in Example I, using 1% by weight of di-tertiarybutyl peroxide as polymerization initiator with the following reaction mixtures.

tanol, dimethyl formamide, xylene-butanol mixtures, hot xylene and acetone.

The copolymers of this invention are prepared by reacting together an unsaturated alcohol taken from the group consisting of allyl and methallyl alcohol and mixtures thereof with one or more alkyl esters of acrylic acid or methacrylic acid in which the alkyl group may contain from 1–20 carbon atoms. The reaction is carried out by mixing the monomers and heating the mixture at 150–250° C. for from 15–75 minutes under autogenous pressure in a substantially oxygen free atmosphere. The reaction is generally carried out without a solvent but a relatively inert organic solvent such as xylene or benzene may be used if desired.

The reaction can be initiated thermally particularly in the 200–250° C. range but it is preferable to use a free radical polymerization initiator such as di-tertiarybutyl peroxide, tertiarybutyl perbenzoate, pinacolone peroxide, etc. The amount of free radical initiator will depend on the temperature conditions used and may vary from none at the higher temperatures to as much as 5% by weight based on the weight of the monomer mixture at the lower temperature.

The reaction should be carried out in a closed reaction vessel under autogenous pressure although it is possible to put added pressure on the system without materially disturbing the course of the reaction.

The products of the polymerization reaction are syrupy liquids which comprise the copolymer dissolved in unreacted monomer and solvent if a solvent is used. The unreacted monomer and solvent are removed by vacuum distillation at temperatures from 100–250° C. The copolymers thus recovered range from brittle solids such as the copolymers of Examples IV and VI to soft pastes such as the copolymers of Examples VII and IX. If due care is taken in the purity of the raw materials and in the handling thereof in the reaction and purification steps, the copolymers are clear and substantially colorless. They are soluble in alcohols, ketones, hot aromatic hydrocarbons, and mixtures of the alcohols and the aromatic hydrocarbons. The copolymers contain from 1–40% of unsaturated alcohol by weight.

The copolymers of this invention are particularly useful in coating compositions as the major resin component thereof together with minor amounts of other conventional coating resins such as the alkyd resins and the phenol, urea or melamine-formaldehyde condensation products. They may also be used as minor components of coating compositions in which the conventional coating resins are present in a major amount. In addition, the copolymers of this invention may be condensed with drying oil acids to produce resins which will air-dry.

The foregoing description and particularly the examples are illustrative of this invention and it is obvious that many variations may be made within the spirit and scope thereof.

| Example | II | III | IV | V | VI | VII | VIII | IX |
|---|---|---|---|---|---|---|---|---|
| Allyl Alcohol | 25 | 12 | 50 | 70 | 30 | 50 | 70 | 30 |
| Ethyl Acrylate | 25 | 35 | | | | | | |
| Methyl Methacrylate | | | 50 | 30 | 70 | | | |
| Butyl Methacrylate | | | | | | 50 | 30 | 70 |
| Temperature, ° C | 150 | 150 | 180 | 200 | 150 | 180 | 200 | 150 |
| Time, minutes | 60 | 60 | 30 | 30 | 30 | 30 | 30 | 30 |
| Conversion, percent | 60 | 45 | 38.5 | 28.3 | 57.1 | 42 | 21.3 | 52.5 |
| Allyl Alcohol In Copolymer, percent | 23 | 32 | 7.15 | 15.1 | 5.8 | 6.15 | 9.5 | 2.0 |

In the table the various monomers are given in parts by weight.

All of the products represented by the formulae in the table are soluble in alcohols such as methanol and bu-

What is claimed is:

1. An organic solvent-soluble binary copolymer of an unsaturated alcohol and an acrylic ester, the unsaturated alcohol constituting from 1–40% by weight of the copolymer, said unsaturated alcohol being taken from the group consisting of allyl alcohol, methallyl alcohol and mixtures thereof and said acrylic ester being a member of the group consisting of alkyl esters of acrylic and alkyl esters of methacrylic acids and mixtures thereof, the alkyl groups in said esters containing from 1–4 carbon atoms.

2. A copolymer as in claim 1 wherein the alcohol is allyl alcohol.

3. A copolymer as in claim 1 wherein the acrylic ester is ethyl acrylate.

4. A copolymer as in claim 1 wherein the acrylic ester is butyl methacrylate.

5. A copolymer as in claim 1 wherein the acrylic ester is methyl methacrylate.

6. A process for preparing an organic solvent-soluble binary copolymer of an unsaturated alcohol and an acrylic ester which comprises mixing the monomers together and heating the mixture at 150–250° C. for from 17–75 minutes under autogenous pressure in a substantially oxygen-free atmosphere, said unsaturated alcohol being a member of the group consisting of allyl alcohol, methallyl alcohol and mixtures thereof, said acrylic ester being a member of the group consisting of alkyl esters of acrylic acid, alkyl esters of methacrylic acid and mixtures thereof, said alkyl groups containing from 1–4 carbon atoms, said copolymers containing 1–40% unsaturated alcohol by weight.

7. A process as in claim 6 wherein the unsaturated alcohol is allyl alcohol.

8. A process as in claim 6 wherein the acrylic ester is ethyl acrylate.

9. A process as in claim 6 wherein the acrylic ester is methyl methacrylate.

10. A process as in claim 6 wherein the acrylic ester is butyl methacrylate.

References Cited in the file of this patent

UNITED STATES PATENTS

| | | |
|---|---|---|
| 2,234,829 | Neher | Mar. 11, 1941 |
| 2,441,515 | Snyder | May 11, 1948 |

UNITED STATES PATENT OFFICE
CERTIFICATE OF CORRECTION

Patent No. 2,817,651                                December 24, 1957

Earl C. Chapin et al.

It is hereby certified that error appears in the printed specification of the above numbered patent requiring correction and that the said Letters Patent should read as corrected below.

Column 3, line 18, for "17-75" read -- 15-75 --.

Signed and sealed this 25th day of February 1958.

(SEAL)
Attest:
KARL H. AXLINE
Attesting Officer

ROBERT C. WATSON
Commissioner of Patent